United States Patent Office 3,847,962
Patented Nov. 12, 1974

3,847,962
PROSTAGLANDINS AND PROCESS AND
INTERMEDIATES THEREFOR
John W. Patterson, Mountain View, and John H. Fried,
Palo Alto, Calif., assignors to Syntex (U.S.A.) Inc.
No Drawing. Original application May 12, 1972, Ser. No.
252,721. Divided and this application Oct. 10, 1973,
Ser. No. 404,857
Int. Cl. C07f 7/18
U.S. Cl. 260—448.8 R                        7 Claims

ABSTRACT OF THE DISCLOSURE

The dl-trans-3-(trans-1'-oct-1' - enyl)-1-trimethylsiloxy-4-oxygenated cyclopent-1-enes, processes for their preparation, and processes for converting them to novel 15-desoxy protaglandins.

This is a division of application Ser. No. 252,721, filed May 12, 1972.

BACKGROUND OF THE INVENTION (1) The Invention

This invention relates to dl-trans-3-(trans-1'-oct-1-enyl)-1-trimethylsiloxy-4-oxygenated cyclopent-1-enes and to processes for the preparation thereof. In a still further aspect, this invention relates to the preparation of novel dl-11-hydroxy - 9 - oxoprosta - 5,13 - dienoic acids and dl-11-hydroxy-9-oxoprosta-5,13-dienoates.

(2) The Prior Art

Prostaglandins are a group of chemically related 20-carbon chain hydroxy fatty acids having the basic skeleton of prostanoic acid:

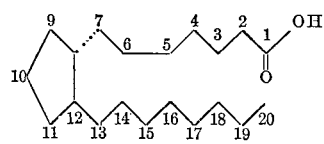

The prostglandins having an oxo group at the C–9 position and a hydroxy group at the C–11 and C–15 positions are known as the PGE series. The hydroxy group at C–11 is further designated by an α or β suffix to indicate its configuration at said position. The natural compounds are the α-hydroxy substituted compounds. They may contain different degrees of unsaturation in the molecule, particularly at C–5 and C–13, and the unsaturation is also indicated by a suffix. For a review on prostaglandins and the definition of primary prostaglandins, see for example, S. Bergstrom, Recent Progress in Hormone Research, 22 (1956), pp. 153–175 and Science, 157 (1967, p. 382 by the same author.

Prostaglandins are widely distributed in mammalian tissues and have been isolated from natural sources in very small amounts. In addition, a number of the natural occurring prostaglandins have been prepared by chemical synthesis; note, for example, J. Am. Chem. Soc., 91 (1969), p. 5675; J. Am. Chem. Soc., 92 (1970), p. 2586 and J. Am. Chem. Soc., 93 (1971), pp 1489–1493 and references cited therein; W. P. Schneider et al., J. Am. Chem. Soc., 90 (1968), p. 5895; U. Axen et al., Chem. Commun. (1969), p. 303 and W. P. Schneider, Chem. Commun. (1969), p. 304.

Because of the remarkable range of biological and pharmacological properties exhibited by this family of compounds, a great deal of interest has focused upon such compounds and, accordingly, we have discovered processes and intermediates for preparing prostaglandins and esters thereof of the PGE series.

SUMMARY OF THE INVENTION

In summary, the novel dl compounds of our invention can be represented by the following formulas:

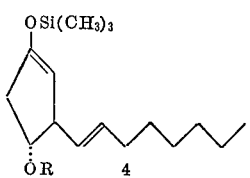

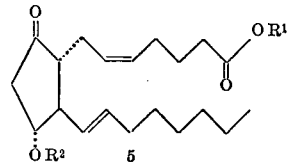

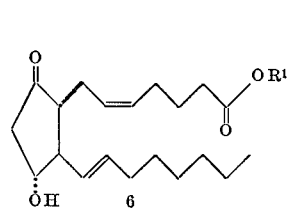

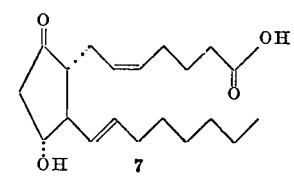

wherein

R is —CH$_2$CH$_2$Cl or —C(CH$_3$)$_2$O(CH$_2$)$_x$CH$_3$, in which x is 0, 1, 2 or 3;
R$^1$ is lower alkyl, —CH$_2$CH$_2$Cl or —CH$_2$CCl$_3$; and
R$^2$ is —C(CH$_3$)$_2$O(CH$_2$)$_x$CH$_3$, in which x is defined as above.

The novel dl compounds of Formulas 5, 6 and 7 exhibit prostaglandin-like pharmacological and biological properties.

Our invention also comprises novel processes for the preparation of the novel compounds above.

DETAILED DESCRIPTION OF THE INVENTION

The compounds of this invention and the processes by which they can be prepared are represented by the following flow sheet:

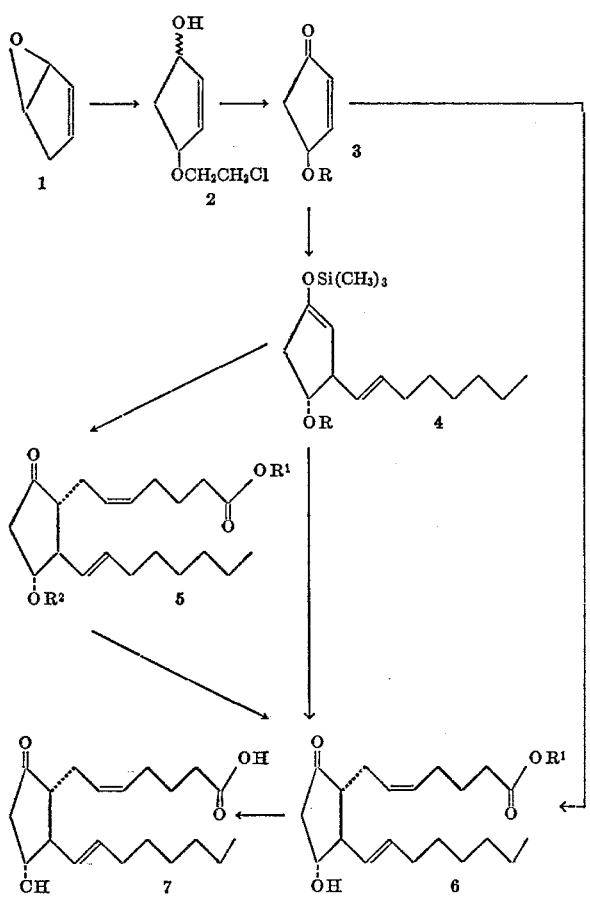

wherein

R is —$CH_2CH_2Cl$ or —$C(CH_3)_2O(CH_2)_xCH_3$, in which x is 0, 1, 2 or 3; and $R^1$ is lower alkyl, —$CH_2CH_2Cl$ or —$CH_2CCl_3$; and $R^2$ is —$C(CH_3)_2O(CH_2)_xCH_3$, in which x is defined as above.

The term lower alkyl refers to both straight chain and branched chain alkyl groups having from one to six carbon atoms, e.g. methyl, ethyl, isopropyl, hexyl, and the like.

A solution of dl-6-oxabicyclo[3.1.0]-hex-2-ene of Formula 1 is treated with 2-chloroethanol in an inert organic solvent, e.g., methylene chloride, benzene, toluene, hexane, and the like, or mixtures thereof, in the presence of an acid catalyst, e.g., boron trifluoride etherate, perchloric acid, and the like, at a temperature of —90° C. to 30° C. from one to 60 minutes, preferably at —73° C. to —70° C. for 20 to 40 minutes, followed by known separation techniques, e.g., chromatography on silica gel, alumina, etc., to give a mixture of dl-cis- and dl-trans-4-chloroethyloxycyclopent-2-en-1-ol, the compounds of Formula 2.

The compounds of Formula 2 are treated with an oxidizing agent, e.g., manganese dioxide, chromium trioxide, and the like, in the presence of an inert organic solvent, e.g., methylene chloride, methanol, ethanol, isopropanol, and the like, or mixtures thereof, to obtain dl-4-chloroethyloxycyclopent-2-en-1-one of Formula 3, wherein R is —$CH_2CH_2Cl$. The oxidation is carried out at a temperature of 0° C. to 50° C., with a temperature of 20° C. to 30° C. being preferred.

The dl-4-(2'-alkoxyprop-2'-oxy)cyclopent-2-en-1-ones, the compounds of Formula 3, wherein R is —$C(CH_3)_2O(CH_2)_xCH_3$, in which x is 0, 1, 2 or 3, are obtained by treating dl-4-hydroxycyclopent-2-en-1-one of Formula 1' with a 2-alkoxypropene of the formula $CH_2=C(CH_3)O(CH_2)_xCH_3$, wherein x is defined as above, in the presence of an acidic catalyst, e.g., phosphorous oxychloride, hydrochloric acid, p-toluenesulfonic acid, and the like, at a temperature of —20° to 50° C. for 15 minutes to four hours, preferably at 20° C. to 30° C. for two to three hours. While the reaction may be carried out in the presence of an inert organic solvent, e.g., diethyl ether, benzene, and the like, it is preferred to add an excess of the 2-alkoxypropene and omit the use of other solvents.

The compounds of Formula 4, dl-trans-3-(trans-1'-oct-1'-enyl)-1-trimethylsiloxy - 4 - chloroethyloxycyclopent-1-ene and dl-trans-4-(2'-alkoxyprop-2'-oxy)-3-(trans-1''-oct-1''-enyl)-1-trimethylsiloxycyclopent - 1 - ene, are obtained by treating the appropriate starting compound of Formula 3 with bis-trans-1-oct-1-enyl copper lithium reagent prepared in situ, followed by treatment with chlorotrimethylsilane.

The bis-trans-1-oct-1-enyl copper lithium reagent is prepared by adding trans-1-bromooct-1-ene or trans-1-iodooct-1-ene (prepared according to Preparation 1 below) to lithium in an inert organic solvent, e.g., ether, tetrahydrofuran, and the like, at a temperature of —20° C. to 10° C., preferably at —15° C. to 5° C. for from one to four hours, followed by the addition of cuprous iodide in an inert organic solvent, e.g., tetrahydrofuran, diethyl ether, and the like, at a temperature of —40° C. to 0° C., preferably —35° C. to —25° C. The molar ratio of the trans-1-bromo- and trans-1-iodooct-1-ene to cuprous iodide should be 2:1 to 1:1, preferably 2:1.

To the in situ prepared bis-trans-1-oct-1-enyl copper lithium reagent there is then added the appropriate compound of Formula 3, dissolved in an inert organic solvent, e.g., tetrahydrofuran, diethyl ether, and the like. After from one to 30 minutes, at a temperature of from —78° to —20° C., preferably from —40° C. to —20° C., the reaction mixture is quenched with an excess of chlorotrimethylsilane to give the compounds of Formula 4, wherein R is defined as above.

The compounds of Formula 6, wherein $R^1$ is defined as above, the dl-11-hydroxy-9-oxoprosta-5,13-dienoates, are obtained directly from the compounds of Formula 4, wherein R is defined as above, dl-trans-3-(trans-1'-oct-1'-enyl)-1-trimethylsiloxy-4 - chloroethyloxycyclopent-1-ene and dl-trans-4-(2'-alkoxyprop-2'-oxy)-3-(trans-1''-oct-1''-enyl)-1-trimethylsiloxycyclopent-1-enes, by treating the appropriate starting compound of Formula 4 in an inert organic solvent, e.g., tetrahydrofuran, diethyl ether, and the like, with lithium in liquid ammonia at a temperature of —78° C. to —33° C. for from one to 30 minutes, after which a transition metal catalyst, e.g., ferric nitrate, cobalt chloride and the like, is added, and the reaction mixture is maintained at a temperature of —45° C. to —33° C. for from five to 60 minutes, followed by the addition of the lower alkyl, chloroethyl or trichloroethyl ester of cis-7-bromohept-5-enoic acid in an inert organic solvent, e.g., tetrahydrofuran, diethyl ether, 1,2-dimethoxy ethane, and the like, for from 30 seconds to 10 minutes, and then treating with a weak organic acid, e.g., aqueous acetic acid, oxalic acid, formic acid, and the like.

The compounds of Formula 6, wherein $R^1$ is defined as above, are also prepared by converting the compounds of Formula 4, wherein R is only the substituent —$C(CH_3)_2O(CH_2)_xCH_3$, in which x is defined as above, to the compounds of Formula 5, wherein $R^2$ is —$C(CH_3)_2O(CH_2)_xCH_3$, in which x is defined as above, and $R^1$ is defined as above, which are isolated, followed by the treatment of the thus-isolated compounds of Formula 5 with a weak organic acid, e.g., aqueous acetic acid, oxalic acid, formic acid, and the like.

The conversion of the compounds of Formula 4, wherein R is only the substituent —C(CH$_3$)$_2$O(CH$_2$)$_x$CH$_3$, dl-trans-4-(2' - alkoxyprop-2'-oxy)-3-(trans - 1" - oct-1"-enyl)-1-trimethylsiloxycyclopent-1-enes, to the compounds of Formula 5, wherein R$^1$ and R$^2$ are defined as above, dl-11-(2'-alkoxyprop-2'-oxy) - 9 - oxoprosta - 5.13 - dienoates, is carried out by treating the appropriate starting compound, in an inert organic solvent, e.g., tetrahydrofuran, diethyl ether, and the like, with lithium amide and liquid ammonia at a temperature of from —50° C. to —33° C. for from five to 60 minutes, followed by the addition of the appropriate ester of cis-7-bromohept-5-enoic acid in an inert organic solvent, e.g., tetrahydrofuran at a temperature of —45° C. to —33° C. for from one to 10 minutes.

Alternatively, the compounds of Formula 6, wherein R$^1$ is defined as above, can be prepared directly from the compounds of Formula 3, wherein R is defined as above, dl-4-chloroethyloxycyclopent-2-en-1-one (R=—CH$_2$CH$_2$Cl)

and dl-4-(2'-alkoxyprop-2'-oxy)cyclopent - 2 - ene-1-ones (R=—C(CH$_3$)$_2$O(CH$_2$)$_x$CH$_3$, in which $x$ is defined as above) without going through the intermediate 1-trimethylsiloxy compounds of Formula 4.

The compounds of Formula 3 are treated with the bis-trans-1-oct-1-enyl copper lithium reagent at a temperature of —40° C. to —20° C. for from five to 60 minutes, in the presence of an inert organic solvent, e.g., tetrahydrofuran, ether, and the like, or mixtures thereof, followed by the addition of the lower alkyl, chloroethyl or trichloroethyl ester of cis-7-bromohept-5-enoic acid in an inert organic solvent and liquid ammonia for from one to 10 minutes at a temperature of —45° C. to —33° C., followed by treatment with a weak organic acid as described above.

By treating the compounds of Formula 6, wherein R$^1$ is only —CH$_2$CH$_2$Cl or —CH$_2$CCl$_3$, with a reducing agent, e.g., chromous acetate, and the like, at a temperature of —5° C. to 35° C. for from 30 minutes to four hours, is productive of the compounds of Formula 7, dl-11-hydroxy-9-oxoprosta-5,13-dienoic acid.

While the above description and the examples which follow refer to dl compounds, it is to be understood that these compounds can be resolved and separated at any stage of the described processes, e.g., crystallization of optically active amine salts of phthalate esters of alcohols, and the individual compounds obtained by said resolution and separation substituted for the dl compound in each step of the processes described.

The novel compounds of Formulas 5, 6 and 7 exhibit prostaglandin-like pharmacological and biological properties and thus are useful in the treatment of mammals where the use of prostaglandins are indicated. These compounds (and pharmaceutically acceptable salts where a compound lends itself to salt formation) are bronchodilators and thus are useful in treating mammals for bronchial spasm or wherever strong bronchodilators are indicated. The compounds are also useful in controlling or palliating hypertension in mammals, and further exhibit central nervous system depressant activity in mammals, and are useful as sedatives. In addition, the compounds are useful for inducing labor, in pregnancy, and for inducing menses to correct or reduce menstrual abnormalities.

These compounds can be administered in a wide variety of dosage forms, either alone or in combination with other pharmaceutically compatible medicaments, in the form of pharmaceutical compositions suited for oral or parenteral administration or inhalation in the case of bronchodilators. The compounds are typically administered as pharmaceutical compositions consisting essentially of the compound and/or salts of the invention and a pharmaceutical carrier. The pharmaceutical carrier can be either a solid material, liquid, or aerosol, in which the compound and/or salt is dissolved, dispersed or suspended, and can optionally contain small amounts of preservatives and/or pH-buffering agents. Suitable preservatives which can be used include, for example, benzyl alcohol and the like. Suitable buffering agents include, for example, sodium acetate and pharmaceutical phosphate salts and the like.

The liquid compositions can, for example, be in the form of solutions, emulsions, suspensions, syrups, or elixirs. The solid compositions can take the form of tablets, powders, capsules, pills or the like, preferably in unit dosage forms for simple administration or precise dosages. Suitable solid carriers include, for example, pharmaceutical grades of starch, lactose, sodium saccharin, talcum, sodium bisulfifite and the like.

For inhalation administration, the compounds can, for example, be administered as an aerosol comprising the compounds or salts in an inert propellant together with a co-solvent (e.g., ethanol) together with optional preservatives and buffering agents. Additional general information concerning the inhalation administration of aerosols can be gained by reference to U.S. Pats. 2,868,691 and 3,095,355.

The compounds are typically administered in dosages of about from 0.1 mg. to 10 mg. per kg. of body weight. The precise effective dosage will, of course, vary depending upon the mode of administration, condition being treated, and host.

A further understanding of the invention can be obtained from the following non-limiting examples. Unless expressly stated to the contrary, dl mixtures are used as starting materials and, correspondingly, dl mixtures are obtained as products. Where necessary, examples are repeated to provide starting material for subsequent examples and, unless otherwise specified, the reactions described herein are carried out under anhydrous or substantially anhydrous conditions.

PREPARATION 1

A mixture of 14.7 ml. of 1-octyne, 10 ml. of hexane and 71 ml. of 24.1% diisobutyl aluminum hydride in toluene is heated under nitrogen at 50° C. for three hours. The hexane and toluene are then removed under reduced pressure. Then 40 ml. of tetrahydrofuran is added and the resulting solution cooled to —70° C. Thereafter, 6 ml. of bromine in 10 ml. of methylene chloride is added over a 20 minute period while maintaining the reaction temperature at —50° C. to —45° C. with external cooling. The reaction mixture is allowed to warm to room temperature and then cautiously hydrolyzed with 20% sulfuric acid below 35° C. The resulting aqueous solution is extracted twice with 100 ml. of methylene chloride. The solvents are removed in vacuo and the residue is distilled to give 14.2 g. of trans-1-bromooct-1-ene.

Similarly, substitution of a stoichiometrically equivalent amount of iodine gives 20.2 g. of trans-1-iodooct-1-ene.

PREPARATION 2

A mixture of 22.6 g. of 7-(2-tetrahydropyranyloxy)-5-heptynoic acid, 200 ml. of methylene chloride, 2 ml. of pyridine, 30 g. of dicyclohexylcarbodiimide and 20 ml. of 2-chloroethanol are stirred under nitrogen at room temperature for two hours. The reaction mixture is filtered and the filtrate is concentrated in vacuo. The residue is then chromatographed on 300 g. of silica gel using ether-hexane mixtures. Those fractions eluted with 20% to 30% of ether-hexanes yield 18 g. of 7-(2'-tetrahydropyranyloxy)-5-heptynoic acid chloroethyl ester.

A solution of 18 g. of 7-(2'-tetrahydropyranyloxy)-5-heptynoic acid chloroethyl ester in 200 ml. of methanol is hydrogenated at one atmosphere in the presence of 1.5 g. of Lindlar (10% palladium on barium sulfate-lead acetate) catalyst. After two hours hydrogen uptake stops and the catalyst is filtered. Evaporation of the methanol in

*vacuo* then yields 18.5 g. of *cis*-7-(2'-tetrahydropyranyl-oxy)-5-heptenoic acid chloroethyl ester.

A solution of 18.5 g. of *cis*-7-(2' - tetrahydropyranyl-oxy)-5-heptenoic acid chloroethyl ester in 100 ml. of 2-chloroethanol is treated with 1 ml. of 6N hydrochloric acid and stirred at room temperature for four hours. The reaction mixture is then poured into 500 ml. of water and extracted twice with 400 ml. of ether. The ether solutions are combined, dried over anhydrous sodium sulfate and evaporated *in vacuo* to give an oil which upon distillation yields 10.3 g. of *cis*-7-hydroxy-5-heptenoic acid chloroethyl ester.

10.3 g. of *cis*-7-hydroxy-5-heptenoic acid chloroethyl ester in 90 ml. of methylene chloride and 13 ml. of triethylamine is cooled to −10° C. and treated with 5 ml. of methanesulfonyl chloride. After an additional 15 minutes at −10° C. the reaction mixture is poured into 300 ml. of water. The organic layer is separated and washed with cold 5% hydrochloric acid and then with saturated sodium bicarbonate. The methylene chloride is removed *in vacuo* and the crude mesylate is then added to a solution of 7 g. of lithium bromide in 120 ml. of acetone at 0° C. After 45 minutes at 0° C. the reaction mixture is poured into 300 ml. of water. This aqueous solution is extracted twice with 150 ml. of methylene chloride. The methylene chloride solutions are combined, concentrated *in vacuo* and the residue obtained is chromatographed on 200 g. of silica gel using ether-hexane mixtures. Those fractions eluted with 30% ether-hexane yield 8.4 g. of chloroethyl *cis*-7-bromo-5-heptenoate.

Similarly, substitution of a stoichiometrically equivalent amount of 2,2,2-trichloroethanol for 2-chloroethanol yields trichloroethyl *cis*-7-bromo-5-heptenoate.

EXAMPLE 1

A solution of 21.5 g. of *dl*-6-oxabicyclo[3.1.0]-hex-2-ene (1) in 70 ml. of methylene chloride is added over 30 minutes to a solution of 150 ml. of 2-chloroethanol, 150 ml. of benzene, 400 ml. of methylene chloride and two drops of boron trifluoride etherate at −78° C. The solution is allowed to warm to room temperature, washed with 200 ml. of water and concentrated *in vacuo* to give an oil. The oil is chromatographed on 700 g. of silica gel using diethyl ether-hexane mixtures. Those fractions eluted with 50% to 60% diethyl ether-hexane yield 17.1 g. of a mixture of *dl-cis-* and *dl-trans*-4-chloroethyloxycyclopent-2-en-1-ol (2).

EXAMPLE 2

A solution of 18 g. of *dl-cis-* and *dl-trans*-4-chloroethyloxycyclopent-2-en-1-ol (2) in 500 ml. of methylene chloride and 25 ml. of isopropyl alcohol is treated with 130 g. of manganese dioxide in eight equal portions, over a period of seven hours at room temperature. The reaction mixture is filtered to remove the manganese dioxide and distilled to yield 13.24 g. of *dl*-4-chloroethyloxycyclopent-2-en-1-one (3, R=―CH₂CH₂Cl).

EXAMPLE 3

9.8 grams (0.1 mole) of *dl*-4-hydroxycyclopent-2-en-1-one (1') is added dropwise to 29.6 g. (0.4 moles) of 2-methoxypropene containing two drops of phosphorous oxychloride and allowed to stand at room temperature for two hours. The reaction mixture is washed with 20 ml. of saturated aqueous sodium bicarbonate, dried over anhydrous sodium sulfate, and the excess 2-methoxypropene removed under reduced pressure to yield *dl*-4-(2'-methoxyprop-2'-oxy)cyclopent-2-en-1-one (3, R=―C(CH₃)₂OCH₃)

Similarly, treating *dl*-4-hydroxycyclopent-2-en-1-one with a stoichiometrically equivalent amount of other 2-alkoxypropenes yields the corresponding *dl*-4-(2'-alkoxyprop-2'-oxy)cyclopent-2-en-1-ones (3,

R=―C(CH₃)₂O(CH₂)ᵧCH₃, in which y is 1, 2 or 3).

EXAMPLE 4

3.82 grams of *trans*-1-bromooct-1-en (20 mmoles), prepared in Preparation 1, is added to 0.25 g. of lithium in ether at 0° C. and stirred for two hours. The resulting lithium reagent is added to 1.90 g. (10 mmoles) of cuprous iodide in 20 ml. of tetrahydrofuran at −30° C. After three minutes a solution of 1.51 g. (10 mmoles) of *dl*-4-chloroethyloxycyclopent-2-en-1-one (3, R=―CH₂CH₂Cl)

in 4 ml. of tetrahydrofuran is added to the above-prepared solution containing *bis-trans*-1-oct-1-enyl copper lithium reagent. After five minutes at −30° C. the reaction mixture is quenched with 3 ml. of chlorotrimethylsilane and allowed to warm to room temperature. The thus-obtained reaction mixture is poured into 100 ml. of saturated aqueous sodium bicarbonate and extracted with hexane. Evaporation of the solvents *in vacuo* yields *dl-trans*-3-(*trans*-1'-oct-1'-enyl) - 1 - trimethylsiloxy-4-chloroethyloxycyclopent-1-ene (4, R=―CH₂CH₂Cl).

Similarly, substituting a stoichiometrically equivalent amount of each of the *dl*-4-(2'-alkoxyprop-2'-oxy)cyclopent-2-en-1-ones (3, R=―C(CH₃)₂O(CH₂)ₓCH₃, in which x is defined as above), prepared in Example 3, for *dl*-4-chloroethyloxycyclopent-2-en-1-one in the above example is productive of the corresponding *dl-trans*-4-(2'-alkoxyprop - 2' - oxy) - 3 - (*trans*-1''-oct-1''-enyl)-1-trimethylsiloxycyclopent-1-enes (4,

R=―C(CH₃)₂O(CH₂)ₓCH₃, in which x is defined as above).

Likewise, substituting a stoichiometrically equivalent amount of *trans*-1-iodooct-1-ene for *trans*-1-bromooct-1-ene in this reaction is productive of the compounds of Formula 4, wherein R is defined as above.

EXAMPLE 5

A solution of 2.07 g. of *dl-trans*-4-(2'-methoxyprop-2'-oxy)-3-(*trans*-1''-oct-1''-enyl) - 1 - trimethylsiloxycyclopent-1-ene (4, R=―C(CH₃)₂OCH₃), prepared in Example 4, in 40 ml. of tetrahydrofuran is added to a solution of 0.125 g. of lithium amide in 60 ml. of liquid ammonia. The reaction mixture is stirred at reflux for 15 minutes and treated with 3.08 g. of chloroethyl *cis*-7-bromohept-5-enoate in 10 ml. of tetrahydrofuran. After three minutes the reaction is quenched with 3 g. of ammonium chloride and the ammonia is evaporated below −20° C. to give a residue which is poured into 500 ml. of aqueous sodium phosphate buffer and extracted with 300 ml. of ether. The ether layer is washed with 300 ml. of aqueous sodium phosphate buffer, dried over anhydrous sodium sulfate, and the ether removed *in vacuo* to yield chloroethyl *dl* - 11 - (2'-methoxyprop-2'-oxy)-9-oxoprosta-5,13-dienoate (5, R²=―C(CH₃)₂OCH₃ and R¹=―CH₂CH₂Cl)

Similarly, substituting a stoichiometrically equivalent amount of the other *dl-trans*-4-(2'-alkoxyprop-2'-oxy)-3-(*trans*-1''-oct-1''-enyl)-1 - trimethylsiloxycyclopent - 1-enes, prepared in Example 4, for *dl-trans*-4-(2'-methoxyprop-2'-oxy)-3-(*trans*-1''-oct-1''-enyl)-1 - trimethylsiloxycyclopent-1-ene used above, is productive of the corresponding chloroethyl *dl*-11-(2'-alkoxyprop-2'-oxy)-9-oxoprosta-5,13-dienoates (5,

R²=―C(CH₃)₂O(CH₂)ᵧCH₃, in which y is 1, 2 or 3, and R¹=―CH₂CH₂Cl).

In like manner, substitution of a stoichiometrically equivalent amount of lower alkyl or trichloroethyl esters of *cis*-7-bromohept-5-enoic acid for chloroethyl *cis*-7- bromohept-5-enoate and the dl-trans-4-(2′-alkoxyprop-2′-oxy)-3-(trans-1″-oct-1″ - enyl) - trimethylsiloxycyclopent-1-enes, prepared in Example 4, is productive of the corresponding compounds of Formula 5 ($R^1$=lower alkyl or —$CH_2CCl_3$ and $R^2$=—$C(CH_3)_2O(CH_2)_xCH_3$, in which x is defined as above), the respective dl-11-(2′-alkoxyprop-2′-oxy)-9-oxoprosta-5,13-dienoates.

EXAMPLE 6

A mixture of 0.514 g. of chloroethyl dl-(2′-methoxyprop-2′-oxy)-9-oxoprosta-5,13-dienoate (5, $$R^2=—C(CH_3)_2OCH_3$$

and $R^1$=—$CH_2CH_2Cl$), prepared in Examples 5, 20 ml. of diethyl ether, 1 ml. of water and 1 ml. of acetic acid are stirred at room temperature for 30 minutes. The reaction mixture is diluted with 100 ml. of ether and washed with 100 ml. of saturated aqueous sodium bicarbonate. Evaporation of the ether in vacuo yields chloroethyl dl-11-hydroxy-9-oxoprosta-5,13-dienoate (6, $R^1$=—$CH_2CH_2Cl$).

Similarly, substituting a stoichiometrically equivalent amount of other chloroethyl dl-11-(2′-alkoxyprop-2′-oxy)-9-oxoprosta-5,13-dienoates (5, $$R^2=—C(CH_3)_2O(CH_2)_yCH_3,$$

in which y is defined as above, and $R^1$=—$CH_2CH_2Cl$), prepared in Example 5, is productive of chloroethyl dl-11-hydroxy-9-oxoprosta-5,13-dienoate (6, $$R^1=—CH_2CH_2Cl).$$

Substituting the other esters of the compounds of Formula 5 ($R^2$=—$C(CH_3)_2O(CH_2)_xCH_3$, in which x is defined as above, and $R^1$=lower alkyl or —$CH_2CCl_3$), prepared in Example 5, is productive of the corresponding esters of Formula 6, the dl-11-hydroxy-9-oxoprosta-5,13-dienoates, in which $R^1$ is lower alkyl or —$CH_2CCl_3$.

EXAMPLE 7

A solution of 2.9 g. of dl-trans-3-(trans-1′-oct-1′-enyl)-1-trimethylsiloxy-4 - chloroethyloxycyclopent - 1 - ene (4, R=—$CH_2CH_2Cl$), prepared in Example 4, in 40 ml. of tetrahydrofuran is added to a solution of 0.24 g. of lithium in 100 ml. of liquid ammonia. After standing for three minutes, 5 mg. of ferric nitrate is added, stirred at reflux for 15 minutes, and then treated with 3 g. of chloroethyl cis-7-bromohept-5-enoate in 10 ml. of tetrahydrofuran. After three minutes at −33° C. the reaction mixture is quenched with 3 g. of ammonium chloride and the ammonia evaporated below −20° C. to give a residue which is poured into 200 ml. of aqueous acetic acid and extracted with ether. After washing with 200 ml. of saturated aqueous sodium bicarbonate evaporation of the solvents gives a crude product which is chromatographed on 150 g. silica gel using ethyl acetate-hexane mixtures. Those fractions eluted with 40% to 50% ethyl acetate-hexane yield chloroethyl dl-11-hydroxy-9-oxoprosta-5,13-dienoate (6, $R^1$=—$CH_2CH_2Cl$).

Similarly, substituting a stoichiometrically equivalent amount of dl-trans-4-(2′-alkoxyprop-2′-oxy)-3-(trans-1″-oct-1″-enyl)-1-trimethylsiloxycyclopent-1-enes (4, $$R=—C(CH_3)_2O(CH_2)_xCH_3,$$

in which x is defined as above), prepared in Example 4, for dl-trans-3-(trans-1′-oct-1′-enyl)-1-trimethylsiloxy - 4 - chloroethyloxycyclopent-1-ene used above, is productive of chloroethyl dl-11-hydroxy-9-oxoprosta-5,13-dienoate (6, $R^1$=—$CH_2CH_2Cl$).

In like manner, substitution of stoichiometrically equivalent amounts of lower alkyl or trichloroethyl esters of cis-7-bromohept-5-enoic acid for chloroethyl-cis-7-bromohept-5-enoate and the dl-1-trimethylsiloxy-4-oxygenated cyclopent-1-enes, prepared in Example 4, is productive of the corresponding esters of Formula 6 ($R^1$=lower alkyl or —$CH_2CCl_3$), the respective esters of dl-11-hydroxy-9-oxoprosta-5,13-dienoic acid.

EXAMPLE 8

3.82 grams of trans-1-bromooct-1-ene (20 mmoles) is added to 0.25 g. of lithium in ether at 0° C. and stirred for two hours. The resulting lithium reagent is added to 1.90 g. (10 mmoles) of cuprous iodide in 20 ml. of tetrahydrofuran at −30° C. After three minutes a solution of 1.70 g. (10 mmoles) of dl-4-(2′methoxyprop-2′-oxy)cyclopent-2-en-1-one (3, R=$C(CH_3)_2OCH_3$) in 4 ml. of tetrahydrofuran is added to the bis-trans-1-oct-1-enyl copper lithium reagent. After five minutes at −30° C., the reaction mixture is added to a solution of 6.05 g. of chloroethyl cis-7-bromohept-5-enoate in 100 ml. of liquid ammonia and 50 ml. of tetrahydrofuran. After three minutes at reflux the reaction is quenched with 3 g. of ammonium chloride and the ammonia is evaporated. The residue is then poured into 300 ml. of aqueous acetic acid, followed by extraction with ether. The ether layer is washed with 300 ml. of saturated aqueous sodium bicarbonate and the ether evaporated in vacuo. The residue is chromatographed on 125 g. silica gel using ethyl acetate-hexane mixtures, and those fractions eluted with 30% to 35% ethyl acetate-hexane give chloroethyl dl-11-hydroxy-9-oxoprosta-5,13-dienoate (6, $R^1$=—$CH_2CH_3Cl$).

Similarly, substituting a stoichiometric equivalent amount of dl-4-(2′-alkoxyprop-2′-oxy)cyclopent-2-en-1-ones (3, R=—$C(CH_3)_2O(CH_2)_yCH_3$, in which y is 1,2- or 3), for dl-4-(2′-methoxyprop-2′-oxy)cyclopent-2-en-1-one, is productive of chloroethyl dl-11-hydroxy-9-oxoprosta-5,13-dienoate (6, $R^1$=—$CH_2CH_2Cl$).

In like manner, substituting a stoichiometric equivalent amount of dl - 4 - chloroethyloxycyclopent-2-en-1-one (3, R=$CH_2CH_2Cl$), for dl - 4 - (2′-methoxyprop-2′-oxy)cyclopent-2-en-1-one, is productive of chloroethyl dl-11 - hydroxy - 9 - oxoprosta - 5,13-dienoate (6, $R^1$= —$CH_2CH_2Cl$).

Likewise, substituting a stoichiometric equivalent amount of lower alkyl or trichloroethyl esters of cis-7-bromohept-5-enoic acid for chloroethyl cis - 7- bromohept - 5 - enoate and the dl-4-oxygenated-cyclopent-2-en-1-ones (R=—$CH_2CH_2Cl$ or —$C(CH_3)_2O(CH_2)_xCH_3$, in which x is defined as above), is productive of the corresponding esters of Formula 6, and dl-11-hydroxy-9-oxoprosta - 5,13-dienoates, in which $R_1$ is lower alkyl or —$CH_2CCl_3$.

EXAMPLE 9

A solution of 414 mg. of chloroethyl dl-11-hydroxy-9-oxoprosta-5,13 dienoate (6, $R^1$=—$CH_2CH_2Cl$) in 20 ml. of aqueous acetone is treated with 680 mg. of chromous acetate and stirred at 0° C. for eight hours. The reaction mixture is poured into 50 ml. of water and extracted with 100 ml. of methylene chloride. The methylene chloride is evaporated to yield dl - 11 - hydroxy - 9-oxoprosta-5,13-dienoic acid (7).

Similarly, substituting a stoichiometrically equivalent amount of trichloroethyl dl - 11 - hydroxy - 9-oxoprosta-5,13-dienoate (6, $R^1$=—$CH_2CCl_3$) for the chloroethyl dl-11 - hydroxy - 9 - oxoprosta-5,13-dienoate is productive of dl-11-hydroxy-9-oxoprosta-5,13-dienoic acid (7).

What is claimed is:

1. The dl compounds of the formula:

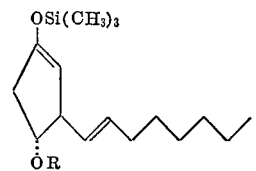

wherein R is —$CH_2CH_2Cl$ or —$C(CH_3)_2O(CH_2)_xCH_3$ in which x is 0, 1, 2 or 3.

2. The compound of Claim 1 in which R is

—CH$_2$CH$_2$Cl,

*dl* - trans - 3 - (*trans*-1'-oct-1'-enyl)-1-trimethylsiloxy-4-chloroethyloxycyclopent-1-ene.

3. The compounds of Claim 1 in which R is

—C(CH$_3$)$_2$O(CH$_2$)$_x$CH$_3$

4. The compound of Claim 3 in which $x$ is 0, *dl-trans*-4 - (2' - methoxyprop - 2'-oxy)-3-(*trans*-1''-oct-1''-enyl)-1-trimethylsiloxycyclopent-1-ene.

5. Process for preparing a *dl* compound of the formula,

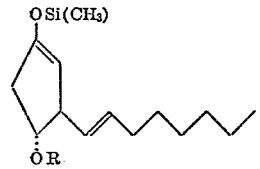

wherein R is —CH$_2$CH$_2$Cl or —C(CH$_3$)$_2$O(CH$_2$)$_x$CH$_3$, in which $x$ is 0, 1, 2 or 3, which comprises (a) treating a *dl* compound of the formula,

wherein R is defined as above, with *bis-trans*-1-oct-1-enyl copper lithium reagent, in an inert organic solvent under reactive conditions; and (b) treating the product of step (a) with chlorotrimethylsilane under reactive conditions.

6. The process of Claim 5 in which R is —CH$_2$CH$_2$Cl.

7. The process of Claim 5 is which R is

—C(CH$_3$)$_2$OCH$_3$

References Cited
UNITED STATES PATENTS

| | | | |
|---|---|---|---|
| 3,758,542 | 9/1973 | Schneider | 260—448.8 R |
| 3,787,449 | 1/1974 | Collins et al. | 260—448.2 B X |
| 3,651,116 | 3/1972 | Lincoln et al. | 260—448.8 R |
| 3,558,682 | 1/1971 | Pappo et al. | 260—468 D |

DANIEL E. WYMAN, Primary Examiner

P. F. SHAVER, Assistant Examiner

U.S. Cl. X.R.

260—448.2 B, 468 R, 468 D, 514 R, 514 D

UNITED STATES PATENT OFFICE
CERTIFICATE OF CORRECTION

Patent No. 3,847,962                    Dated  November 12, 1974

Inventor(s) John W. Patterson et al

It is certified that error appears in the above-identified patent and that said Letters Patent are hereby corrected as shown below:

Column 6, line 60, "7-(2-" should read --- 7-(2'- ---. Column 9, line 12, "Examples" should read --- Example ---. Column 9, line 51, "bicarbonate evaporation" should read --- bicarbonate, evaporation ---. Column 9, line 67 "stoichiometricalily" should read --- stoichiometrically ---. Column 10, line 8, "R=C" should read --- R=-C ---. Column 10, line 32, "R=C" should read --- R=-C ---. Column 10, line 33, "di-" should read --- dl- ---. Column 11, lines 12-19, that portion of the formula

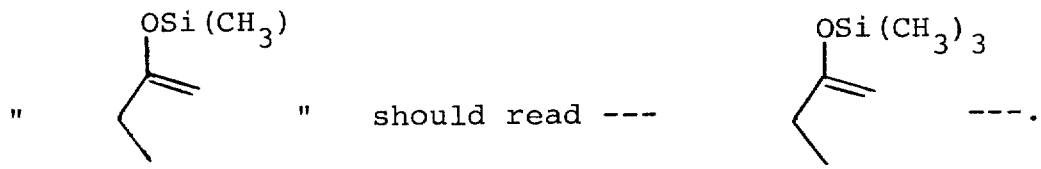

Signed and Sealed this fourteenth Day of October 1975

[SEAL]

Attest:

RUTH C. MASON
Attesting Officer

C. MARSHALL DANN
Commissioner of Patents and Trademarks